United States Patent
Yamada et al.

(10) Patent No.: US 12,480,503 B2
(45) Date of Patent: Nov. 25, 2025

(54) ELECTRIC COMPRESSOR

(71) Applicant: MITSUBISHI HEAVY INDUSTRIES ENGINE & TURBOCHARGER, LTD., Sagamihara (JP)

(72) Inventors: Yuki Yamada, Tokyo (JP); Naomichi Shibata, Sagamihara (JP); Katsuyuki Osako, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/573,763

(22) PCT Filed: Oct. 3, 2022

(86) PCT No.: PCT/JP2022/036975
§ 371 (c)(1),
(2) Date: Dec. 22, 2023

(87) PCT Pub. No.: WO2023/058601
PCT Pub. Date: Apr. 13, 2023

(65) Prior Publication Data
US 2024/0295220 A1    Sep. 5, 2024

(30) Foreign Application Priority Data
Oct. 7, 2021 (JP) ................................ 2021-165353

(51) Int. Cl.
*F04D 17/10* (2006.01)
*F04D 25/06* (2006.01)
*F04D 29/42* (2006.01)

(52) U.S. Cl.
CPC ....... *F04D 17/105* (2013.01); *F04D 25/0606* (2013.01); *F04D 29/4213* (2013.01)

(58) Field of Classification Search
CPC ........ F04D 17/10; F04D 17/105; F04D 25/16; F04D 29/4206; F04D 29/4213
See application file for complete search history.

(56) References Cited

U.S. PATENT DOCUMENTS 7,107,973 B1 *  9/2006  Jones ................... F04D 25/163
                                                           417/406
10,662,970 B2 *  5/2020  Nakamura ............ F04D 29/188
(Continued)

FOREIGN PATENT DOCUMENTS

CN          102588344 A      7/2012
DE    102018109838 A1 *    10/2019
(Continued)

OTHER PUBLICATIONS

Translation of DE102018109838, Retrieved Feb. 2025.*
(Continued)

*Primary Examiner* — Courtney D Heinle
*Assistant Examiner* — Cameron A Corday
(74) *Attorney, Agent, or Firm* — Birch, Stewart, Kolasch & Birch, LLP

(57) ABSTRACT

An electric compressor comprising: an electric motor; a rotation shaft configured to be driven by the electric motor; two impellers respectively provided to both ends of the rotation shaft; two housings that respectively contain the two impellers; and an intake manifold pipe configured to branch off from one intake pipe to supply air to each of the two housings. Each of the two housings includes an intake port which opens in a direction intersecting the axial direction of the rotation shaft and to which the intake manifold pipe is connected.

11 Claims, 7 Drawing Sheets

(56) References Cited

U.S. PATENT DOCUMENTS

| | | | | |
|---|---|---|---|---|
| 2007/0231164 | A1* | 10/2007 | Eybergen | H01M 8/04111 |
| | | | | 417/410.1 |
| 2013/0112298 | A1 | 5/2013 | Nakae et al. | |
| 2013/0243586 | A1* | 9/2013 | Rodriguez | F04D 29/4213 |
| | | | | 415/208.1 |
| 2019/0048893 | A1* | 2/2019 | Kim | F04D 17/12 |
| 2020/0212462 | A1* | 7/2020 | Morishita | F04D 17/122 |
| 2023/0332607 | A1* | 10/2023 | Shibata | F04D 29/056 |

FOREIGN PATENT DOCUMENTS

| | | |
|---|---|---|
| JP | 10-318191 A | 12/1998 |
| JP | 2006-525460 A | 11/2006 |
| JP | 2011-117402 A | 6/2011 |
| JP | 5228069 B2 | 7/2013 |
| JP | 2017-122390 A | 7/2017 |
| JP | 2019-90370 A | 6/2019 |
| JP | 2020-105993 A | 7/2020 |
| WO | WO 2004/098677 A1 | 11/2004 |
| WO | WO 2019/096890 A2 | 5/2019 |

OTHER PUBLICATIONS

International Preliminary Report on Patentability and Written Opinion of the International Searching Authority for International Application No. PCT/JP2022/036975, dated Apr. 18, 2024, with an English translation.

International Search Report and Written Opinion of the International Searching Authority for International Application No. PCT/JP2022/036975, dated Dec. 6, 2022.

Japanese Office Action for Japanese Application No. 2021-165353, dated Jul. 1, 2025, with English translation.

* cited by examiner

ELECTRIC COMPRESSOR

TECHNICAL FIELD

The present disclosure relates to an electric compressor.

The present application claims priority based on Japanese Patent Application No. 2021-165353 filed in Japan on Oct. 7, 2021, the contents of which are incorporated herein by reference.

BACKGROUND ART

In the related art, an electric compressor configured to compress a gas is known. For example, an electric compressor disclosed in PTL 1 includes an electric motor, a pair of impellers respectively provided in both end portions of a shaft of the electric motor, a pair of compressor housings for respectively accommodating the pair of impellers, a pair of suction ports respectively located on outer sides in an axial direction with respect to the compressor housings, an outlet pipe extending in a substantially U-shape so that outlets of scroll parts of the pair of compressor housings are assembled with each other, and a discharge port provided in a merging portion which is a downstream end of the outlet pipe. The pair of suction ports face mutually opposite directions along the axial direction, and an outlet port faces one side in a radial direction.

CITATION LIST

Patent Literature

[PTL 1] Japanese Unexamined Patent Application Publication No. 2019-90370

SUMMARY OF INVENTION

Technical Problem

In the above-described electric compressor, the pair of suction ports are respectively located on both end sides of the electric compressor in the axial direction. Therefore, the electric compressor is lengthened in the axial direction, thereby causing a possibility that the electric compressor has a larger size.

An object of the present disclosure is to provide an electric compressor having a smaller size.

Solution to Problem

According to at least one embodiment of the present disclosure, there is provided an electric compressor including an electric motor, a shaft configured to be driven by the electric motor, two impellers respectively provided in both ends of the shaft, two housings respectively accommodating the two impellers, and an intake manifold pipe configured to branch off from one intake pipe to supply a gas to each of the two housings.

Each of the two housings includes an intake port which is open in a direction intersecting with an axial direction of the shaft, the intake manifold pipe being connected to the intake port.

Advantageous Effects of Invention

According to the present disclosure, it is possible to provide an electric compressor having a smaller size.

DESCRIPTION OF EMBODIMENTS

Figure 1:
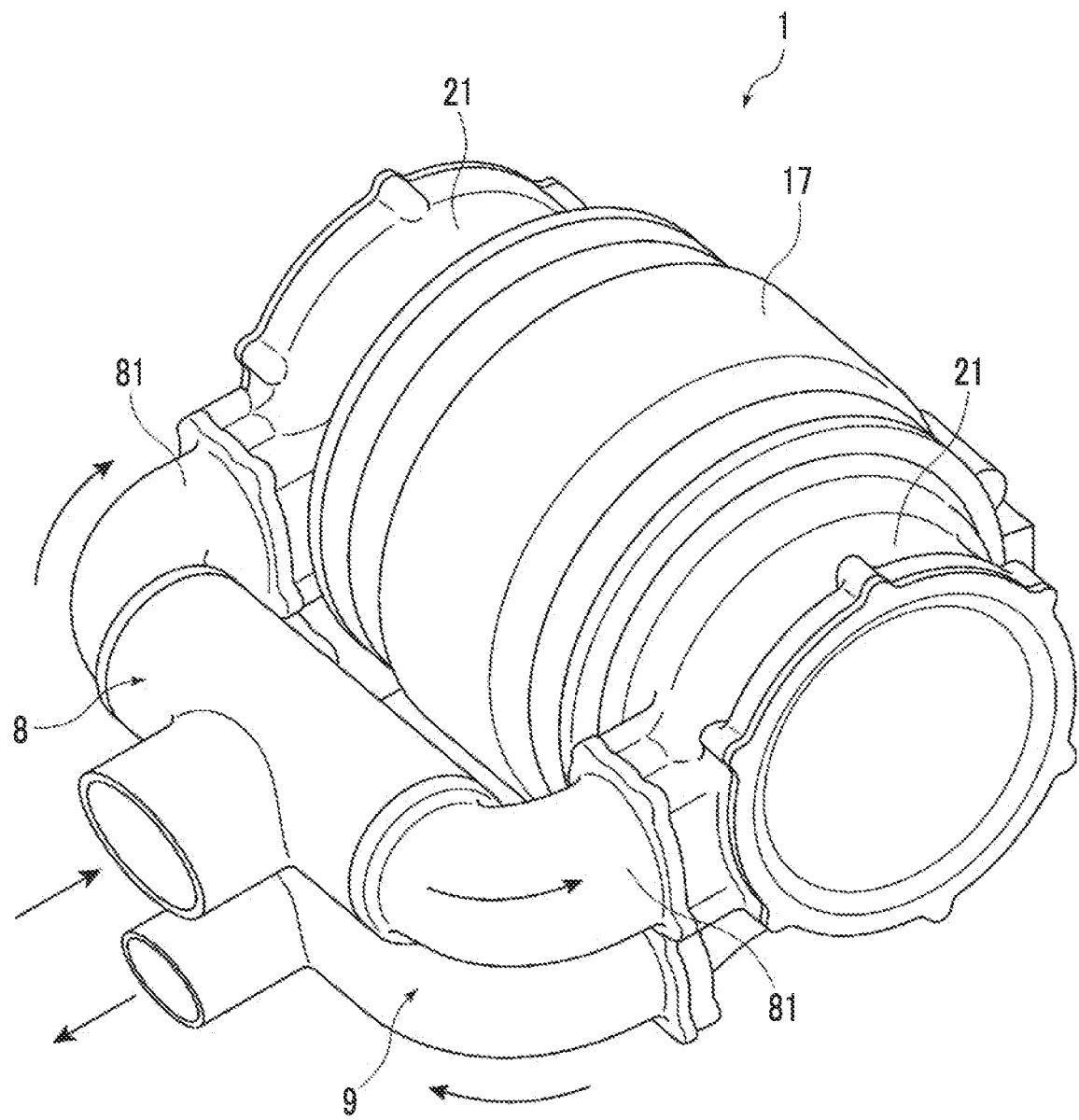
FIG. 1 is a schematic view of an electric compressor according to an embodiment of the present disclosure.

Hereinafter, some embodiments of the present disclosure will be described with reference to the accompanying drawings. However, dimensions, materials, shapes, and relative dispositions of components described as the embodiments or illustrated in the drawings are not intended to limit the scope of the present disclosure, and are merely examples for describing the present disclosure.

For example, expressions representing relative or absolute dispositions such as "in a certain direction", "along a certain direction", "parallel", "orthogonal", "center", "concentric", or "coaxial" not only strictly represent the dispositions, but also represent a state where the dispositions are relatively displaced with a tolerance or at an angle or a distance to such an extent that the same function can be obtained.

For example, expressions representing that things are in an equal state such as "same", "equal", and "homogeneous" not only strictly represent an equal state, but also represent a state where a difference exists with a tolerance or to such an extent that the same function can be obtained.

For example, expressions representing shapes such as a quadrangular shape and a cylindrical shape not only represent shapes such as a quadrangular shape and a cylindrical shape in a geometrically strict sense, but also represent shapes including an uneven portion or a chamfered portion within a range where the same effect can be obtained.

Meanwhile, expressions of "being provided with", "including", or "having" one component are not exclusive expressions excluding existence of other components.

The same reference numerals may be assigned to the same configurations, and description thereof may be omitted.

Overview of Electric Compressor

FIG. 1 is a schematic view of an electric compressor according to an embodiment of the present disclosure. For example, an electric compressor 1 is a centrifugal compressor mounted on a traveling vehicle. As a more specific example, the traveling vehicle is a fuel cell vehicle, and the electric compressor 1 supplies a compressed gas (for example, air) to a fuel cell. For example, the fuel cell includes a solid oxide fuel cell (SOFC), and includes a solid electrolyte provided between an air electrode and a fuel electrode. For example, the electric compressor 1 according to another embodiment may be an electric centrifugal compressor for an internal combustion engine which pressurizes a combustion gas fed to an internal combustion engine of an engine.

In the electric compressor 1 of the present embodiment, a gas is supplied to each of two housings 21 from an intake manifold pipe 8. Inside each of the housings 21, an impeller 5 compresses and discharges the gas as an electric motor 10 (to be described later) is driven (refer to FIG. 2). The compressed gas discharged from each of the housings 21 merges in an outlet manifold pipe 9, and thereafter, the compressed gas is supplied to the fuel cell, for example, via a compressed gas supply line (not illustrated). In the present embodiment, a single electric compressor 1 supplies the compressed gas to the fuel cell. However, another embodiment may be configured to include a multi-stage compressor in which a plurality of the electric compressors 1 are disposed in series. For example, the compressed air discharged from the outlet manifold pipe 9 of one electric compressor 1 may be supplied to the intake manifold pipe 8 of the other electric compressor 1. In this case, the air further compressed by the other electric compressor 1 may be discharged from the outlet manifold pipe 9, and may be supplied to the fuel cell. In this case, the plurality of electric compressors 1 can form the multi-stage compressor. Hereinafter, a configuration of the single electric compressor 1 will be described in detail.

Outline of Internal Structure of Electric Compressor 1

Figure 2:
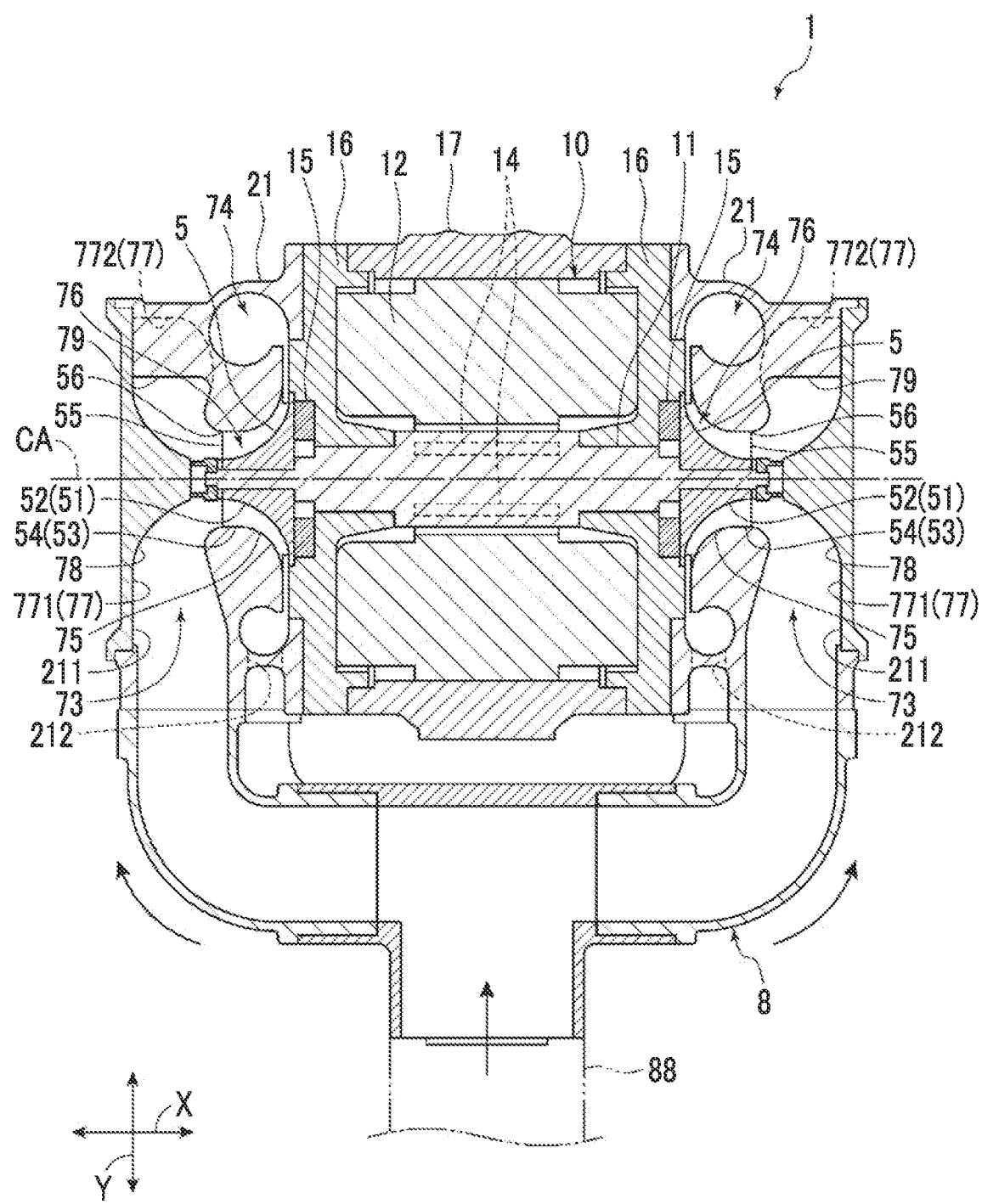
FIG. 2 is a schematic axial sectional view of the electric compressor according to the embodiment of the present disclosure.

FIG. 2 is a schematic axial sectional view of the electric compressor according to the embodiment of the present disclosure. In the illustrated embodiment, the electric compressor 1 includes a shaft 3, two bearings 15 that rotatably support the shaft 3, and two bearing housings 16 that respectively support the two bearings 15. The two bearing housings 16 are mechanically connected to a stator housing 17 (to be described later) located at a central portion in an axial direction of the electric compressor 1 via a fastening member such as a fastening bolt. In the following description, an extending direction of an axis CA of the shaft 3 may be referred to as an axial direction X, and a direction orthogonal to the axis CA may be referred to as a radial direction Y. The axis CA of the shaft 3 when viewed in the axial direction may be referred to as a center 3C of the shaft 3.

As illustrated in FIG. 2, the electric compressor 1 includes an electric motor 10 including a rotating body 11 serving as a rotor and a motor stator 12 serving as a stator, two impellers 5 respectively provided in both ends of the above-described shaft 3, two housings 21 for respectively accommodating the two impellers 5, and a stator housing 17 for accommodating the motor stator 12 between the two housings 21. The rotating body 11 is a rotor assembly attached to an outer peripheral portion of the shaft 3, and includes a plurality of permanent magnets 14. The motor stator 12 includes a stator coil, and is configured so that a magnetic field for rotating the rotating body 11 on which the permanent magnets 14 are mounted is generated by using electric power supplied from a power source (not illustrated). When the rotating body 11 is rotated by the magnetic field generated by the motor stator 12 (power generated by the electric motor 10), the shaft 3 to which the two impellers 5 are attached is rotated. The two impellers 5 are provided outside in the axial direction X with respect to the above-described two bearings 15.

Structure for Supplying Gas to Housing 21

The electric compressor 1 includes an intake manifold pipe 8 configured to branch off from one intake pipe 88 to supply a gas to each of the two housings 21. Each of the two housings 21 includes an intake port 211 to which the intake manifold pipe 8 is connected. Each intake port 211 is open in a direction intersecting with the axial direction X of the shaft 3. In the embodiment illustrated in FIG. 2, the intake port 211 is open in a direction orthogonal to the axial direction X. In addition, the intake manifold pipe 8 is provided on a side opposite to the shaft 3 with respect to each intake port 211. Inside each of the housings 21, the gas supplied from the intake port 211 is compressed by the rotating impeller 5.

According to the above-described configuration, the intake port 211 included in each of the housings 21 is located with respect to the shaft 3 in the direction intersecting with the axial direction X. Therefore, compared to a case of adopting a configuration in which the intake port 211 and the housing 21 are aligned in the axial direction, a length of the electric compressor 1 in the axial direction can be shortened. Therefore, it is possible to realize the electric compressor 1 having a smaller size.

Outline of Internal Structure of Housing 21

In addition to the intake port 211 described above, each of the housings 21 illustrated in FIG. 2 further includes an exhaust port 212 configured to discharge the gas compressed by the impeller 5. In addition, a supply flow path 73 for guiding the gas guided into the supply flow path 73 from the intake port 211 to the impeller 5, and a scroll flow path 74 for guiding the gas passing through the impeller 5 to the exhaust port 212 are formed inside each of the housings 21.

The impeller 5 has a hub 51 mechanically connected to the shaft 3, and a plurality of impeller blades 53 provided on an outer peripheral surface 52 of the hub 51. The impeller 5 is rotatable around the axis CA of the shaft 3 integrally with the shaft 3. The impeller 5 of the present example includes a centrifugal impeller configured to guide the gas fed from the intake port 211 side to the inside in the axial direction X and to further guide the gas to the exhaust port 212 side. A gap (clearance) is formed between each of tips 54 of the plurality of impeller blades 53 and a shroud surface 75 curved in a protruding shape inside the housing 21.

In the embodiment illustrated in FIG. 2, the housing 21 is combined with another member (bearing housing 16 in the illustrated example) to form an impeller chamber 76 for rotatably accommodating the impeller 5. The impeller chamber 76 communicates with the supply flow path 73 located on an upstream side in a flowing direction of the gas and the scroll flow path 74 located on a downstream side in the flowing direction of the gas. The scroll flow path 74 has a spiral shape that surrounds an outer side of the impeller 5 in the radial direction Y. The shroud surface 75 defines a portion of the impeller chamber 76. In each of the housings 21, the gas guided to the impeller 5 from the supply flow path 73 is compressed by the rotation of the impeller 5. Thereafter, the gas flows outward in the radial direction Y through the scroll flow path 74, and is discharged from the exhaust port 212.

Exhaust Structure of Housing 21

Figure 3:
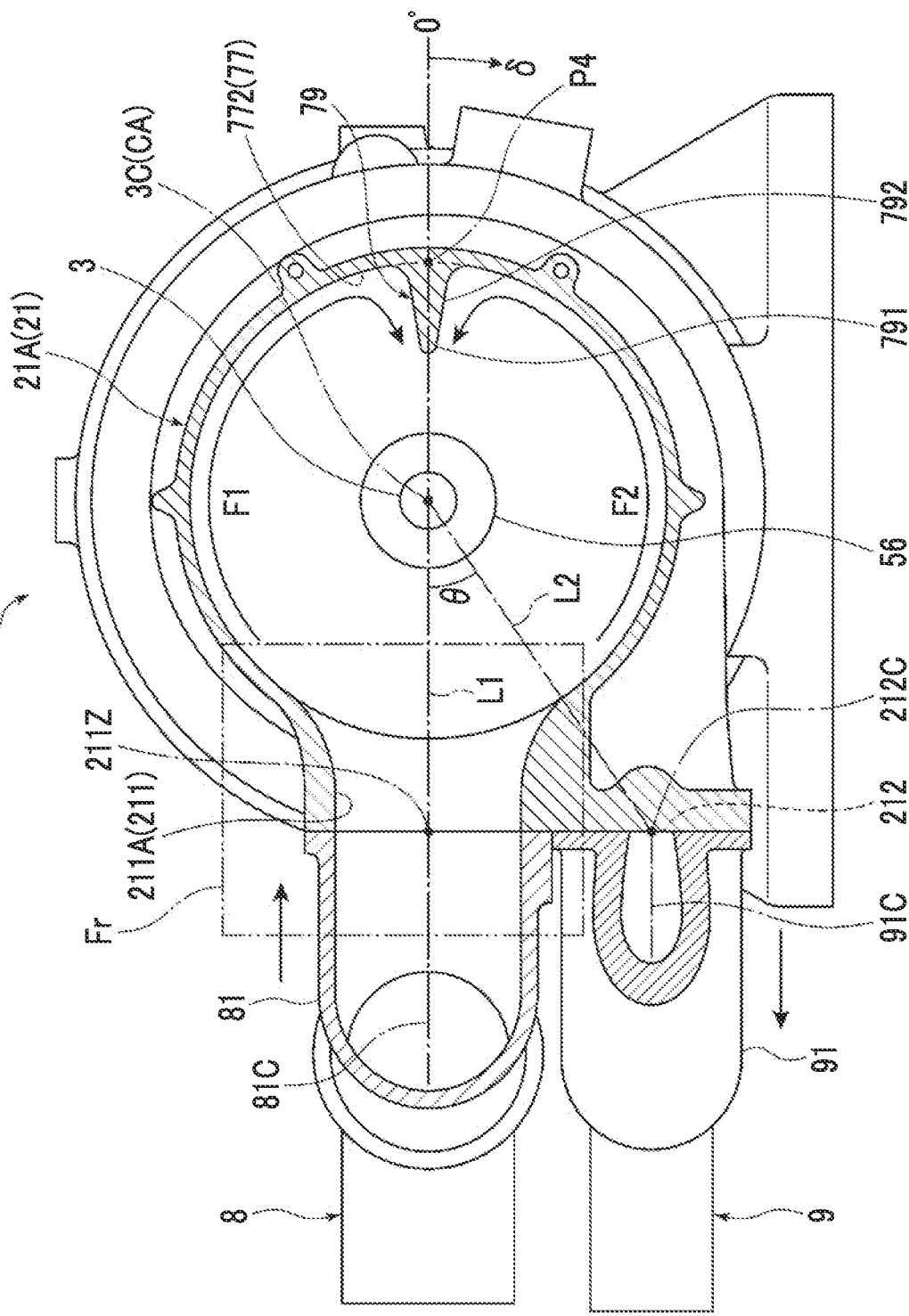
FIG. 3 is a schematic radial sectional view of an electric compressor according to a first embodiment of the present disclosure.

FIG. 3 is a schematic radial sectional view of an electric compressor according to a first embodiment of the present disclosure. In each of housings 21A (21) included in an electric compressor 1A (1) according to the first embodiment, at least a portion of the exhaust port 212 overlaps the intake port 211 in the axial direction. Moreover, the exhaust port 212 of the present example is located entirely inside in the axial direction with respect to the intake port 211. That is, in the axial direction, an inner end of the exhaust port 212 is located inside an inner end of the intake port 211, and an outer end of the exhaust port 212 is located inside an outer end of the intake port 211 (not illustrated). In addition, in the embodiment illustrated in FIG. 3, an opening direction of the intake port 211 and an opening direction of the exhaust port 212 are parallel to each other.

The electric compressor 1A according to some embodiments further includes an outlet manifold pipe 9 for merging the compressed air discharged from each exhaust port 212 of the two housings 21A. In addition, each of the two housings 21A is configured so that an angle θ from a center 2112 of the intake port 211 to a center 212C of the exhaust port 212 with the center 3C of the shaft 3 as a reference is larger than 0° and smaller than 120°, in a cross section (that is, a radial cross section of the electric compressor 1A) orthogonal to the axial direction X of the shaft 3.

Here, the center 211Z of the intake port 211 substantially coincides with a downstream end of a center axis 81C in a connection portion 81 of the intake manifold pipe 8. The connection portion 81 is a portion connected to an intake port 211A (211) of each of the housings 21A in the intake manifold pipe 8. In addition, the center 212C of the exhaust port 212 substantially coincides with an upstream end of a center axis 91C in an outlet connection portion 91 of the outlet manifold pipe 9. The outlet connection portion 91 is a portion connected to the exhaust port 212 of each of the housings 21A in the outlet manifold pipe 9. In addition, the angle θ is a smaller angle among angles formed by a virtual line L1 extending from the center 211Z of the intake port 211 through the center 3C of the shaft 3 and a virtual line L2 extending from the center 212C of the exhaust port 212 to the center 3C of the shaft 3.

According to the above-described configuration, since the angle θ is smaller than 120°, both the intake manifold pipe 8 and the outlet manifold pipe 9 are disposed on one side with respect to the shaft 3 in a radial cross section of the electric compressor 1A. In this manner, compared to when the intake manifold pipe 8 and the outlet manifold pipe 9 are disposed across the shaft 3, a pipe structure of the intake manifold pipe 8 and the outlet manifold pipe 9 can be simplified. The angle θ is more preferably smaller than 90°. In this case, the intake manifold pipe 8 and the outlet manifold pipe 9 can be brought closer to each other. Therefore, a more compact pipe structure can be realized. In addition, when the angle θ is smaller than 45°, the pipe structure can be more compact.

Details of Structure of Connection Portion 81 and Intake Port 211

Figure 4:
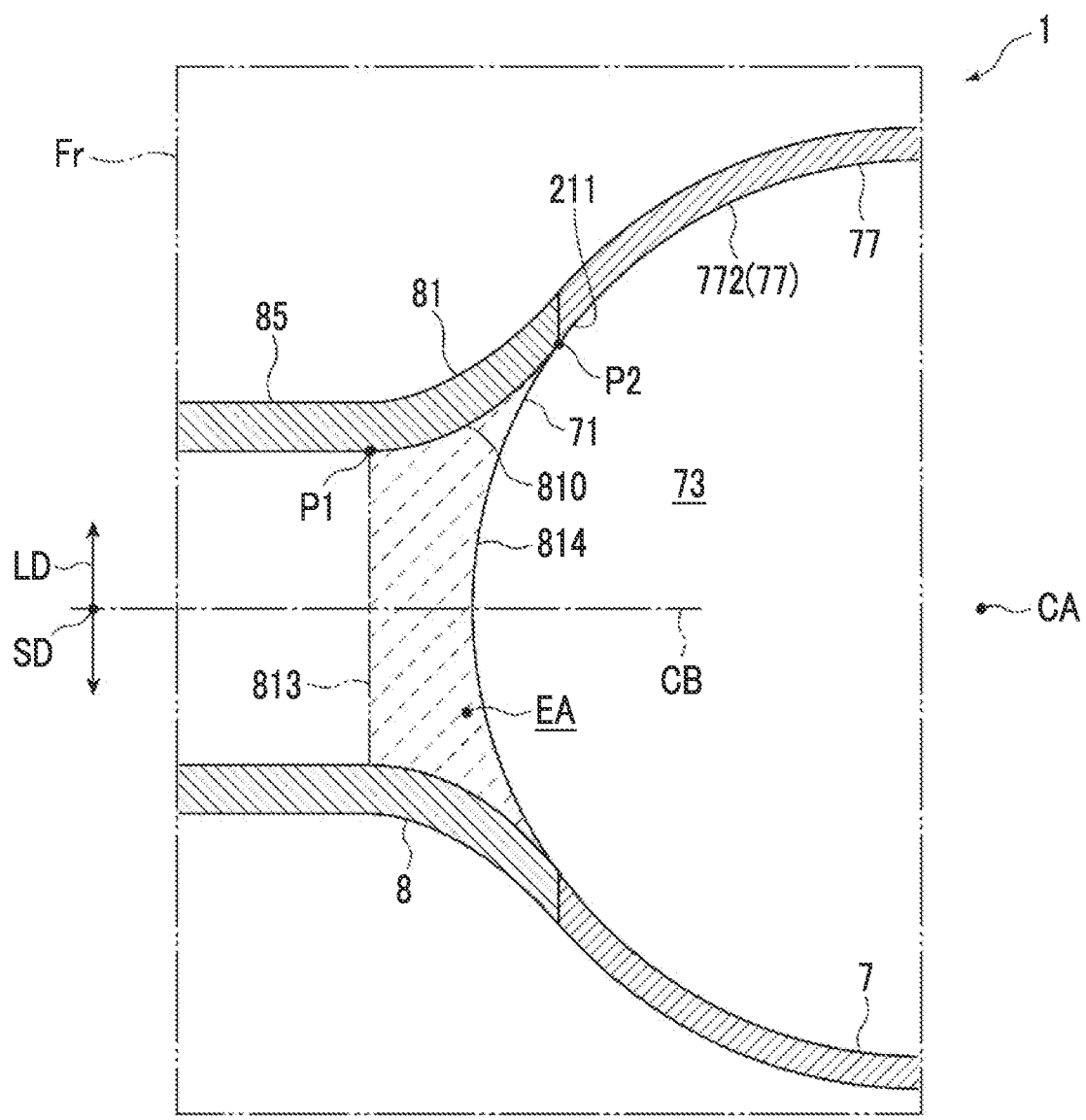
FIG. 4 is an enlarged sectional view schematically illustrating a region surrounded by a two-dot chain line in FIG. 3.
Figure 5:
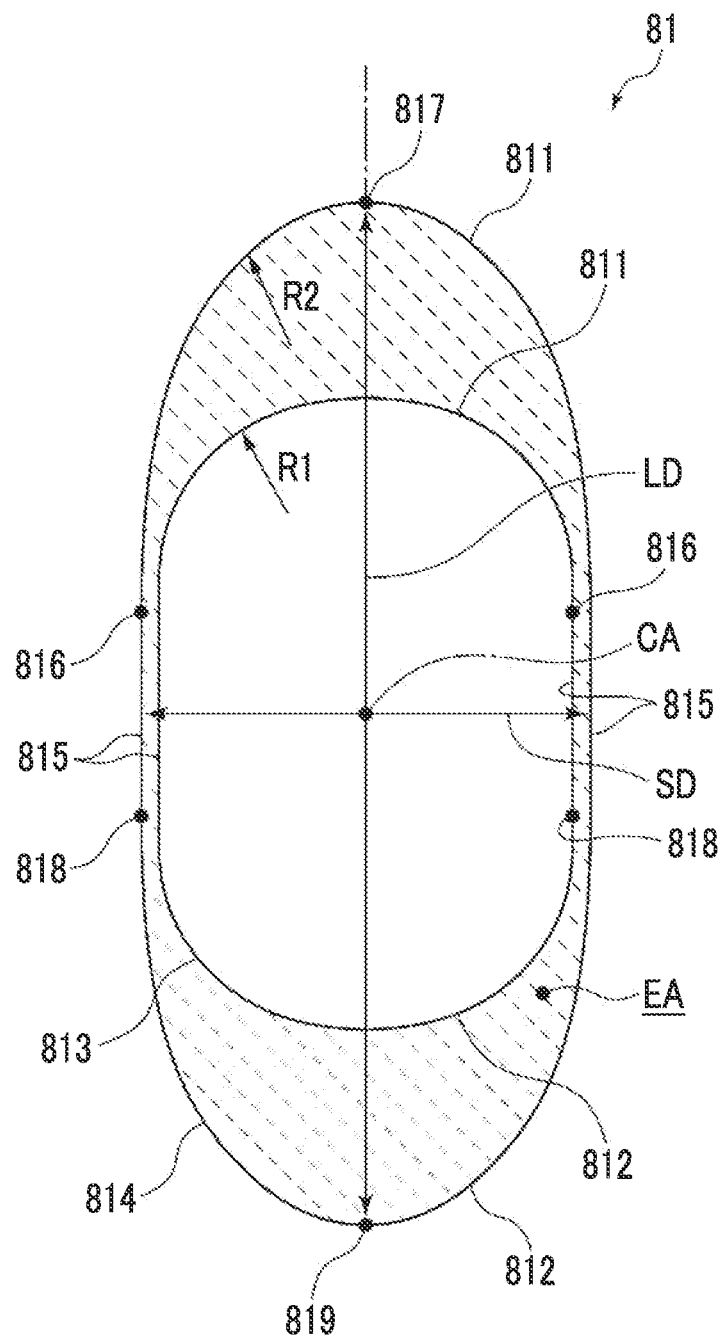
FIG. 5 is a sectional view of a connection portion according to the first embodiment of the present disclosure.

FIG. 4 is an enlarged sectional view schematically illustrating a region surrounded by a two-dot chain line Fr in FIG. 3. FIG. 5 is a sectional view of the connection portion according to the embodiment of the present disclosure, and more specifically, is a sectional view when viewed from an upstream side in the flowing direction of the gas in the connection portion.

As illustrated in FIG. 4, the connection portion 81 has an enlarged region EA whose flow path cross-sectional area increases toward the intake port 211 side of the housing 21. The enlarged region EA is defined by an inner surface 810 of the connection portion 81. In the embodiment illustrated in FIG. 4, one side (downstream side) of the connection portion 81 connected to the intake port 211 is an end point P2 of the enlarged region EA, and a side opposite to the one side (upstream side) is a start point P1 of the enlarged region EA. A flow path cross section 813 of the connection portion 81 at the start point P1 is narrower than a flow path cross section 814 of the connection portion 81 at the end point P2. A shape of the flow path cross section of the intake manifold pipe 8 located on the upstream side with respect to the flow path cross section 814 is substantially the same as a shape of the flow path cross section 813, regardless of a position of the intake manifold pipe 8 in an extending direction.

In some embodiments, as illustrated in FIG. 5, the flow path cross sections (for example, the flow path cross sections 813 and 814) of the connection portion 81 included in the intake manifold pipe 8 include protruding curved portions 811 and 812 having a longitudinal direction LD along a direction orthogonal to the axis CA of the shaft 3 and formed on both end sides in the longitudinal direction LD. According to the above-described configuration, the flow path cross section of the connection portion 81 has an elliptical shape extending along the longitudinal direction LD. Therefore, while an increase in the connection portion 81 in the axial direction X of the shaft 3 is prevented, the flow path cross-sectional area of the connection portion 81 can be increased. Since the flow path cross-sectional area of the connection portion 81 is increased, a required amount of the gas can be supplied to the housing 21. In addition, the flow path cross section of the connection portion 81 has the elliptical shape. Therefore, compared to when the flow path cross section has a polygonal shape such as a rectangular shape, a pressure loss of the compressed gas flowing through the connection portion 81 can be prevented.

In some embodiments, as illustrated in FIG. 5, the flow path cross sections (for example, the flow path cross sections 813 and 814) of the connection portion 81 described above have a short direction SD along the axis CA of the shaft 3. According to the above-described configuration, the flow path cross section of the connection portion 81 is formed into a shape having the short direction SD along the axis CA. In this manner, the length of the connection portion 81 in the axial direction X can be shortened, and it is possible to realize the electric compressor 1 having a smaller size and a reduced weight.

In some embodiments, as illustrated in FIG. 5, the flow path cross sections (for example, the flow path cross sections 813 and 814) of the connection portion 81 described above further include a pair of straight line portions 815 for connecting end portions of the pair of protruding curved portions 811 and 812 to each other. Each of the straight line portions 815 extends parallel to the longitudinal direction LD. In this case, since the flow path cross section of the connection portion 81 includes the straight line portion 815, a velocity component of the gas flowing toward the intake port 211 side through the connection portion 81 can be increased. Therefore, the gas can smoothly flow to the impeller 5 from the intake port 211. In this manner, the pressure loss of the gas in the connection portion 81 and the intake port 211 can be reduced.

In some embodiments, as illustrated in FIGS. 4 and 5, the flow path cross section of the connection portion 81 described above is formed so that the length in the longitudinal direction LD increases toward the intake port 211 side. In the illustrated embodiment, the length in the longitudinal direction LD in the flow path cross section 814 (end point P2 of the enlarged region EA) is longer than the length in the longitudinal direction LD in the flow path cross section 813 (start point P1 of the enlarged region EA). In contrast, variations in the length in the short direction SD are small from the start point P1 to the end point P2 of the enlarged region EA, and the length in the longitudinal direction LD is increased. Therefore, the flow path cross-sectional area is enlarged.

According to the above-described configuration, the flow path cross section of the connection portion 81 is formed so that the length in the longitudinal direction LD increases toward the intake port 211 side. Therefore, the gas flowing along the inner surface 810 of the connection portion 81 can flow directly along an inner surface 77 that defines the supply flow path 73 of the housing 21. Separation of the gas from the inner surface 77 of the housing 21 can be prevented by causing the gas to flow along the inner surface 77 of the housing 21. Therefore, the pressure loss of the gas in the supply flow path 73 of the housing 21 can be reduced.

In some embodiments, as illustrated in FIG. 4, the above-described intake port 211 is formed on an inner peripheral wall surface 772 that defines an outer peripheral side of the supply flow path 73. The inner surface 810 of the connection portion 81 and the inner peripheral wall surface 772 of the housing 21 are smoothly connected to each other. Here, description of "smoothly connected" means that a boundary between the inner surface 77 and the inner peripheral wall surface 772 is rounded without forming a corner portion. In the illustrated embodiment, the inner surface 810 has a protruding curved shape. In order to reduce the pressure loss of the gas in the connection portion 81 connected to the intake port 211 in the connection portion 81, it is preferable to increase a curvature of a portion connected to the inner surface 77 on the inner peripheral wall surface 772 as much as possible. According to the above-described configuration, the inner surface 810 of the connection portion 81 and the inner peripheral wall surface 772 of the housing 21 are smoothly connected. Therefore, the pressure loss of the compressed gas in the connection portion 81 and the intake port 211 can be reduced.

In some embodiments, as illustrated in FIG. 5, the flow path cross section of the connection portion 81 described above is formed so that a maximum curvature of the protruding curved portions 811 and 812 increases toward the intake port 211 side. In the illustrated embodiment, a maximum curvature R2 of the protruding curved portions 811 and 812 in the flow path cross section 814 (end point P2 of the enlarged region EA) is greater than a maximum curvature R1 of the protruding curved portions 811 and 812 in the flow path cross section 813 (start point P1 of the enlarged region EA). In the illustrated embodiment, each of the protruding curved portions 811 and 812 in the flow path cross section 813 is formed so that the curvatures are equal to one end in the longitudinal direction LD from a connection end connected to the straight line portion 815. In contrast, each of the protruding curved portions 811 and 812 in the flow path cross section 814 is formed so that the curvatures increase toward one end 817 and 819 in the longitudinal direction LD from connection ends 816 and 818 connected to the straight line portion 815. In some embodiments, the maximum curvature R2 is at least twice the maximum curvature R1.

According to the above-described configuration, the flow path cross section of the connection portion 81 is formed so that the maximum curvatures of the protruding curved portions 811 and 812 increase toward the intake port 211 side. Therefore, the compressed gas flowing through the connection portion 81 can be smoothly guided to the intake port 211. In this manner, the pressure loss of the gas from the connection portion 81 to the intake port 211 can be reduced.

Details of Flow Path Structure Inside Housing 21

Referring back to FIG. 2, each of the housings 21 according to some embodiments includes the inner surface 77 that defines the supply flow path 73 for guiding the gas supplied from the intake port 211 to the impeller 5. The inner surface 77 includes an inner end wall surface 771 that defines the outside of the supply flow path 73 in the axial direction X, and an inner peripheral wall surface 772 that defines an outer peripheral side (outside in the radial direction Y) of the supply flow path 73. The above-described housing 21 further includes a guide protruding portion 78 that protrudes toward the impeller 5 from the inner end wall surface 771. In the illustrated embodiment, an outer peripheral surface of the guide protruding portion 78 is formed in a recessed curved shape.

According to the above-described configuration, the gas flowing through the supply flow path 73 of the housing 21 can be guided to the impeller 5 by the guide protruding portion 78 protruding toward the impeller 5 from the inner end wall surface 771. For example, a flow of the gas flowing inward in the radial direction Y along the inner end wall surface 771 can be bent along an outer peripheral surface of the guide protruding portion 78. In this manner, the flow can be changed to an inward flow in the axial direction X. In this case, the guide protruding portion 78 can introduce the gas into the impeller 5 along the axial direction. Therefore, compared to when the gas is directly introduced into the impeller 5 from the outside in the radial direction Y, efficiency of the electric compressor 1 can be improved.

In some embodiments, as illustrated in FIG. 2, the electric compressor 1 includes an anti-swirl plate 79 protruding toward the intake port 211 from a portion opposite to the intake port 211 in the above-described inner peripheral wall surface 772. As illustrated in FIG. 3, in a cross section (that is, a radial cross section of the electric compressor 1) orthogonal to the axial direction of the electric compressor 1, a position of an intersection P4 between the above-described virtual line L1 extending through the axis CA of the shaft 3 from the center 211Z of the intake port 211 and the inner peripheral wall surface 772 is set to a position of 0°, and one direction (clockwise direction in the example in FIG. 3) in a circumferential direction around the axis CA is set to a positive direction. In this manner, an angle in the circumferential direction of the shaft 3 in the positive direction with respect to the position of 0° is defined as δ. A tip 791 closest to the axis CA of the anti-swirl plate 79 described above exists in a range of −90°≤δ≤90°. In the present embodiment, the tip 791 exists in a range of −45°≤δ≤45°, and more specifically, exists in a range of −15°≤δ≤15°. In the illustrated embodiment, the anti-swirl plate 79 has an outer surface (inclined surface) 792 inclined so that a width dimension (that is, the length of the shaft 3 in the circumferential direction) decreases toward the tip 791.

FIG. 3 illustrates that a tip end 56 of a leading edge 55 (refer to FIG. 2) of the impeller 5 corresponds to an inlet of the impeller 5. As illustrated in FIG. 3, a flow of the gas flowing through the supply flow path 73 along the inner peripheral wall surface 772 in either a clockwise direction (arrow F1) or a counterclockwise direction (arrow F2) can be bent along an outer surface 792 of the anti-swirl plate 79. In this manner, the flow can be changed to a flow toward the inlet of the impeller 5.

According to the above-described configuration, since the anti-swirl plate 79 is provided, it is possible to prevent occurrence of unintended swirling of the gas inside the housing 21. Therefore, it is possible to prevent fluctuations in performance of the electric compressor 1.

Figure 6:
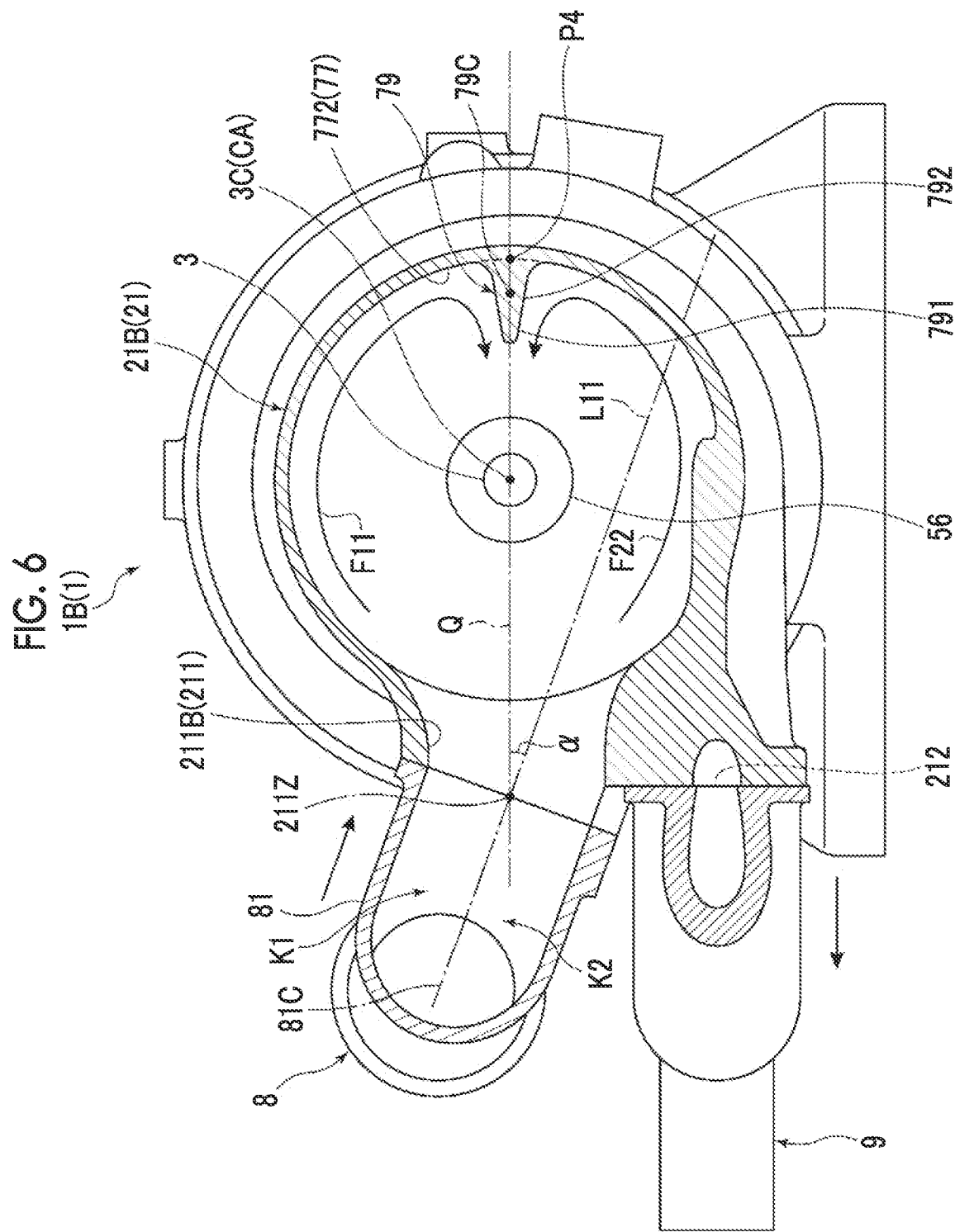
FIG. 6 is a schematic radial sectional view of an electric compressor according to a second embodiment.

FIG. 6 is a schematic radial sectional view of an electric compressor according to a second embodiment. In an electric compressor 1B (1) according to the second embodiment, as illustrated in FIG. 6, the tip 791 of the anti-swirl plate 79 described above is located on an outer peripheral side of the shaft 3 with respect to the tip end 56 (corresponding to the inlet of the impeller 5) of the leading edge 55 of the impeller 5. In addition, an opening direction of an intake port 211B (211) is not parallel to an opening direction of the exhaust port 212. In addition, when viewed in the axial direction of the electric compressor 1B, each of housings 21B (21) is configured so that a virtual line L11 obtained by extending the center axis 81C of the connection portion 81 in the intake manifold pipe 8 does not intersect with the center 3C of the shaft 3.

When the tip 791 of the anti-swirl plate 79 is located on the axis CA side of the shaft 3 with respect to the tip end 56 of the leading edge 55 of the impeller 5, a difference in the velocity components facing inward in the radial direction Y becomes greater between the gas flowing on the inner peripheral wall surface 772 along an arrow F11 and the gas flowing along an arrow F22. Therefore, there is a possibility of degraded compression efficiency in the impeller 5. According to the above-described configuration, the tip 791 of the anti-swirl plate 79 is located on the outer peripheral side of the shaft 3 with respect to the tip end 56 of the leading edge 55 of the impeller 5. Therefore, the difference in the velocity components described above can be reduced. In this manner, degradation in the compression efficiency in the impeller 5 can be prevented.

In addition, due to a pipe structure of the intake manifold pipe 8, the gas flow may be constantly biased in the connection portion 81 in some cases. In this case as well, the difference in the velocity components described above becomes greater. Therefore, there is a possibility of degraded compression efficiency in the impeller 5. In this regard, according to the above-described configuration, the virtual line L11 obtained by extending the center axis 81C of the connection portion 81 in the intake manifold pipe 8 is configured not to intersect with the center 3C of the shaft 3. Therefore, even when the gas flow is biased in the connection portion 81, the above-described difference in the velocity components of the gas inside the housing 21 can be reduced. In this manner, degradation in the compression efficiency in the impeller 5 can be prevented.

As illustrated in FIG. 6, each of the housings 21 when viewed in the axial direction of the electric compressor 1 is configured so that a virtual line (hereinafter, referred to as a straight line Q) defined by a center 79C of the anti-swirl plate 79 and the center 3C of the shaft 3 passes through the inside of the intake port 211B. Here, the center 79C of the anti-swirl plate 79 is a midpoint of the anti-swirl plate 79 in the circumferential direction of the shaft 3 and a midpoint of the anti-swirl plate 79 in the radial direction Y, in a radial cross section of the electric compressor 1B. In the illustrated embodiment, a direction in which the anti-swirl plate 79 protrudes from the inner peripheral wall surface 772 of the housing 21 coincides with the radial direction Y.

According to the above-described configuration, it is possible to prevent the smaller angle α among the angles formed by the virtual line L11 and the straight line Q from becoming excessively large. Therefore, it is possible to prevent the gas from excessively flowing to the virtual line L11 side with respect to the shaft 3. Therefore, a flow rate of the gas flowing along the arrow F22 from the intake port 211B on the virtual line L11 side with respect to the shaft 3 and a flow rate of the gas flowing along the arrow F11 on a side opposite to the virtual line L11 with respect to the shaft 3 can be more properly equalized.

Figure 7:
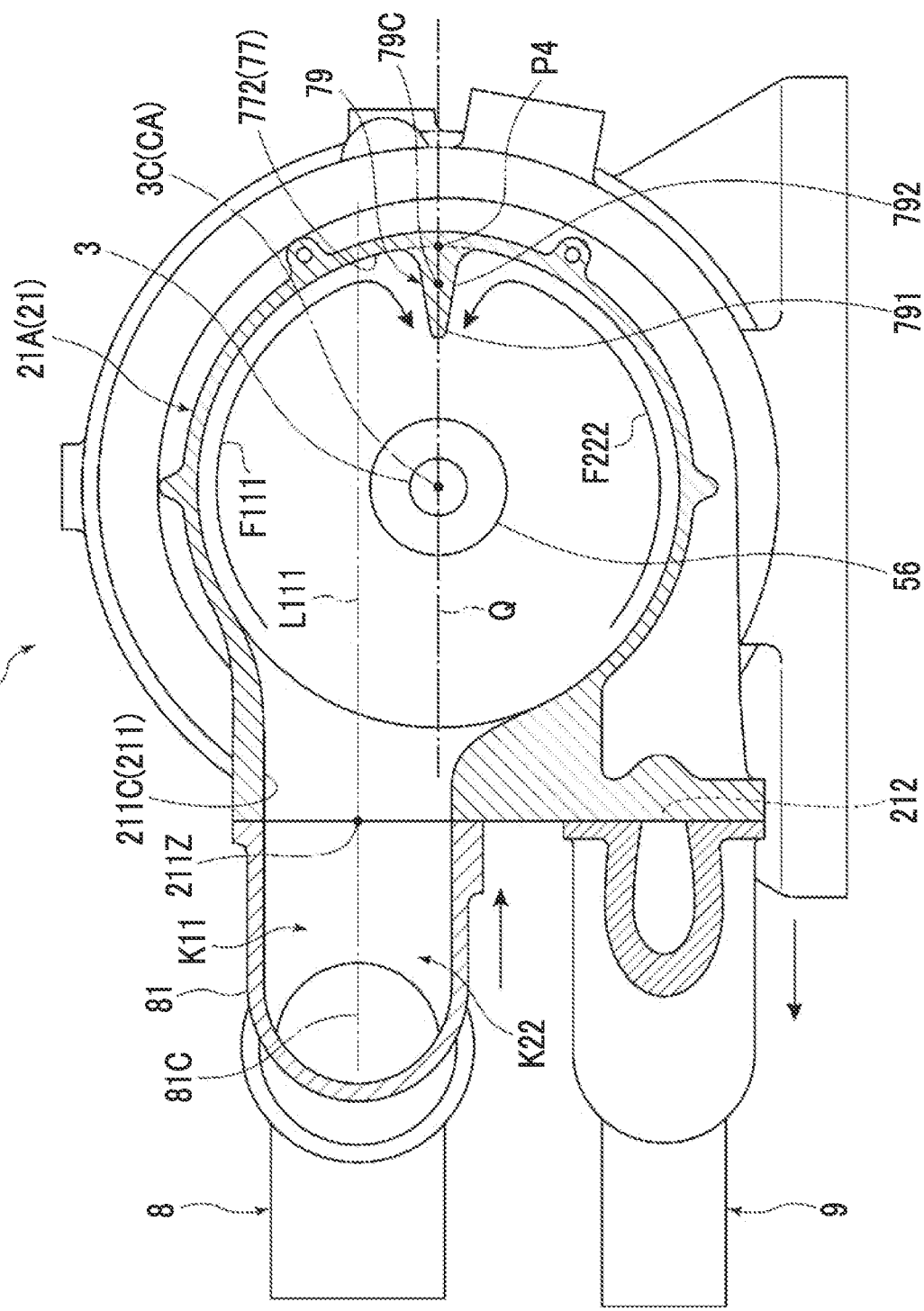
FIG. 7 is a schematic radial sectional view of an electric compressor according to a third embodiment.

FIG. 7 is a schematic radial sectional view of an electric compressor according to a third embodiment. In an electric compressor 1C (1) according to the third embodiment, an opening direction of an intake port 211C (211) included in a housing 21C (21) is parallel to an opening direction of the exhaust port 212. As illustrated in FIG. 7, each of the housings 21 is configured so that a virtual line L111 obtained by extending the center axis 81C of the connection portion 81 extends parallel to the above-described straight line Q defined by the center 79C of the anti-swirl plate 79 and the center 3C of the shaft 3, at a position avoiding the center 3C of the shaft 3, when viewed in the axial direction of the electric compressor 1.

According to the above-described configuration, the housing 21 is configured so that the gas more easily flows on the virtual line L111 side with respect to the shaft 3 than on the side opposite to the virtual line L111. Therefore, even when the gas flow is constantly biased in the connection portion 81, the difference in the velocity components facing inward in the radial direction Y can be reduced between the gas flowing along an arrow F111 on the inner peripheral wall surface 772 and the gas flowing along an arrow E222. In this manner, degradation in the compression efficiency in the impeller 5 can be prevented.

SUMMARY

Contents described in some of the above-described embodiments are understood as follows, for example.

1) According to at least one embodiment of the present disclosure, there is provided the electric compressor (1) including the electric motor (10), the shaft (3) configured to be driven by the electric motor (10), the two impellers (5) respectively provided in both ends of the shaft (3), the two housings (21) respectively accommodating the two impellers (5), and the intake manifold pipe (8) configured to branch off from the one intake pipe (88) to supply the gas to each of the two housings (21).

Each of the two housings (21) includes the intake port (211) which is open in the direction intersecting with the axial direction (X) of the shaft (3), the intake manifold pipe (8) being connected to the intake port (211).

According to the configuration of 1) above, compared to a case of adopting a configuration in which the intake port (211) and the housing (21) are aligned in the axial direction (X), the length of the electric compressor (1) in the axial direction (X) can be shortened. Therefore, the electric compressor (1) having a smaller size is realized.

2) In some embodiments, in the electric compressor (1) according to 1) above, each of the two housings (21) includes the exhaust port (212) configured to discharge the compressed gas compressed by the impeller (5).

The electric compressor (1) further includes the outlet manifold pipe (9) for merging the compressed gas discharged from the exhaust port (212) of each of the two housings (21).

Each of the two housings (21) is configured so that the angle (θ) from the center of the intake port (211) to the center of the exhaust port (212) with the center of the shaft (3) as a reference is smaller than 120°, in the cross section orthogonal to the axial direction (X) of the shaft (3).

According to the configuration of 2) above, in the radial cross section of the electric compressor (1), both the intake manifold pipe (8) and the outlet manifold pipe (9) are disposed on one side with respect to the shaft (3). In this manner, compared to a case of adopting a configuration in which the intake manifold pipe (8) and the outlet manifold pipe (9) are disposed across the shaft (3), the pipe structure of the intake manifold pipe (8) and the outlet manifold pipe (9) can be simplified.

3) In some embodiments, in the electric compressor (1) according to 1) or 2) above, the intake manifold pipe (8) includes the two connection portions (81), each of which being connected to the intake port (211).

The flow path cross section of the connection portion (81) has the longitudinal direction (LD) along the direction orthogonal to the axial direction (X) of the shaft (3), and includes the protruding curved portions (811 and 812) formed on both end sides in the longitudinal direction.

According to the configuration of 3) above, the flow path cross section of the connection portion (81) has an elliptical shape extending along the longitudinal direction (LD). Therefore, while an increase in the connection portion (81) in the axial direction (X) of the shaft (3) is prevented, the flow path cross-sectional area of the connection portion (81) can be increased. Since the flow path cross-sectional area of the connection portion (81) is increased, a required amount of the gas can be supplied to the housing (21). In addition, the flow path cross section of the connection portion (81) has the elliptical shape. Therefore, compared to when the flow path cross section has a polygonal shape such as a rectangular shape, the pressure loss of the gas flowing through the connection portion (81) can be prevented.

4) In some embodiments, in the electric compressor (1) according to 3) above, the flow path cross section of each of the two connection portions (81) has the short direction (SD) along the axial direction (X) of the shaft (3).

According to the configuration of 4) above, the length of the connection portion (81) in the axial direction (X) of the shaft (3) can be shortened, and the electric compressor (1) having a smaller size is realized.

5) In some embodiments, in the electric compressor (1) according to 3) or 4) above, the flow path cross section of each of the two connection portions (81) is formed so that the length in the longitudinal direction (LD) increases toward the intake port (211) side.

According to the configuration of 5) above, the gas flowing along the inner surface (810) of the connection portion (81) can flow directly into the inner surface (77) of the housing (21). Therefore, separation of the gas from the inner surface (77) of the housing (21) can be prevented. Therefore, the pressure loss of the gas in the housing (21) can be prevented.

6) In some embodiments, in the electric compressor (1) according to 5) above, the flow path cross section of each of the two connection portions (81) is formed so that the maximum curvature of the protruding curved portions (811 and 812) increases toward the intake port (211) side.

According to the configuration of 6) above, the gas flowing through the connection portion (81) can be smoothly guided to the intake port (211). In this manner, the pressure loss of the gas from the connection portion (81) to the intake port (211) can be reduced.

7) In some embodiments, in the electric compressor (1) according to any one of 1) to 6) above, each of the two housings (21) includes the inner surface (77) that defines the supply flow path (73) for guiding the gas supplied from the intake port (211) to the impeller (5), the inner surface (77) including the inner end wall surface (771) that defines the side opposite to the impeller (5) in the supply flow path (73), and the inner peripheral wall surface (772) that defines the outer peripheral side of the supply flow path (73), and the guide protruding portion (78) that protrudes toward the impeller (5) from the inner end wall surface (771).

According to the configuration of 7) above, the gas can be introduced into the impeller (5) along the axial direction (X) by the guide protruding portion (78). Therefore, compared to when the gas is directly introduced into the impeller (5) from the outside in the radial direction (Y), the efficiency of the electric compressor (1) can be improved.

8) In some embodiments, in the electric compressor (1) according to 7) above, each of the two housings (21) includes the anti-swirl plate (79) that protrudes from the portion opposite to the intake port (211) on the inner surface (77).

According to the configuration of 8) above, it is possible to prevent occurrence of unintended swirling of the gas inside the housing (21). In this manner, it is possible to prevent fluctuations in the performance of the electric compressor (1).

9) In some embodiments, in the electric compressor (1) according to 8) above, the tip of the anti-swirl plate (79) is located on the outer peripheral side of the shaft (3) with respect to the tip end (56) of the leading edge (55) of the impeller (5).

According to the configuration of 9) above, inside the housing (21), it is possible to reduce the difference in the velocity components facing inward in the radial direction (Y) in the gas flowing across the center (3C) of the shaft (3) (gas flowing on the inner peripheral wall surface 772 along the arrow F11 and the gas flowing along the arrow F22). In this manner, degradation in the compression efficiency of the gas in the impeller (5) can be prevented.

10) In some embodiments, in the electric compressor (1) according to any one of 1) to 9) above, the intake manifold pipe (8) includes the two connection portions (81), each of which being connected to the intake port (211).

each of the two housings (21) is configured so that the virtual line (L11) obtained by extending the center axis (81C) of the connection portion (81) corresponding to each of the housings (21) in the intake manifold pipe (8) does not intersect with the center (3C) of the shaft (3), when viewed in the axial direction of the shaft (3).

According to the configuration of 10) above, even when the gas flow is constantly biased in the connection portion (81), inside the housing (21), it is possible to reduce the difference in the velocity components facing inward in the radial direction (Y) in the gas flowing across the center (3C) of the shaft (3) (gas flowing on the inner peripheral wall surface 772 along the arrow F11 and the gas flowing along the arrow F22). In this manner, degradation in the compression efficiency of the gas in the impeller (5) can be prevented.

11) In some embodiments, in the electric compressor (1) according to 10) above, each of the two housings (21) includes the inner surface (77) that defines the supply flow path (73) for guiding the gas supplied from the intake port (211) to the impeller (5), the inner surface (77) including the inner end wall surface (771) that defines the side opposite to the impeller (5) in the supply flow path (73), and the inner peripheral wall surface (772) that defines the outer peripheral side of the supply flow path (73), and the anti-swirl plate

(79) that protrudes from the portion opposite to the intake port (211) on the inner surface (77).

Each of the two housings (21) is configured so that the straight line (Q) defined by the center (79C) of the anti-swirl plate (79) and the center (3C) of the shaft (3) passes through the inside of the intake port (211), when viewed in the axial direction of the shaft (3).

According to the configuration of 11) above, the straight line (Q) defined by the center (79C) of the anti-swirl plate (79) and the center (3C) of the shaft (3) passes through the inside of the intake port (211). Therefore, inside the housing (21), it is possible to prevent an excessive flow rate of the gas flowing on the virtual line (L11) side with respect to the shaft (3). Therefore, inside the housing (21), the flow rate of the gas flowing on the virtual line (L11) side with respect to the shaft (3) and the flow rate of the gas flowing on the side opposite to the virtual line (L11) with respect to the shaft (3) can be more properly equalized.

12) In some embodiments, in the electric compressor (1) according to 8) or 9) above, the intake manifold pipe (8) includes the two connection portions (81), each of which being connected to the intake port (211).

Each of the two housings (21) is configured so that the virtual line (L111) obtained by extending the center axis (81C) of the connection portion (81) corresponding to each of the housings (21) in the intake manifold pipe (8) extends parallel to the straight line (Q) defined by the center (79C) of the anti-swirl plate (79) and the center (3C) of the shaft (3), at the position avoiding the center (3C) of the shaft (3), when viewed in the axial direction of the shaft (3).

According to the configuration of 12) above, even when the gas flow is constantly biased in the connection portion (81), inside the housing (21), it is possible to reduce the difference in the velocity components facing inward in the radial direction (Y) in the gas flowing across the center (3C) of the shaft (3) (gas flowing on the inner peripheral wall surface 772 along the arrow F111 and the gas flowing along the arrow F222). In this manner, degradation in the compression efficiency of the gas in the impeller (5) can be prevented.

REFERENCE SIGNS LIST

1: Electric compressor
3: Shaft
3C: Center
5: Impeller
8: Intake manifold pipe
9: Outlet manifold pipe
10: Electric motor
21: Housing
54: Tip
55: Leading edge
56: Tip end
73: Supply flow path
77: Inner surface
78: Guide protruding portion
79: Anti-swirl plate
79C: Center
81: Connection portion
81C: Center axis
88: Intake pipe
91C: Center axis
211: Intake port
211Z: Center
212: Exhaust port
212C: Center
771: Inner end wall surface
772: Inner peripheral wall surface
791: Tip
810: Inner surface
811: Protruding curved portion
812: Protruding curved portion
813: Flow path cross section
814: Flow path cross section
CA: Axis
L11, L111: Virtual line
θ: Angle

The invention claimed is:

1. An electric compressor comprising:
an electric motor;
a shaft configured to be driven by the electric motor;
two impellers respectively provided in both ends of the shaft;
two housings respectively accommodating the two impellers; and
an intake manifold pipe configured to branch off from one intake pipe to supply a gas to each of the two housings,
wherein each of the two housings includes an intake port which is open in a direction intersecting with an axial direction of the shaft, the intake manifold pipe being connected to the intake port, and
wherein each of the two housings includes
an inner surface that defines a supply flow path for guiding the gas supplied from the intake port to a leading edge of the impeller, the inner surface including an inner end wall surface that defines a side opposite to the impeller in the supply flow path, and an inner peripheral wall surface that defines an outer peripheral side of the supply flow path, and
a guide protruding portion that protrudes toward the leading edge of the impeller from the inner end wall surface.

2. The electric compressor according to claim 1,
wherein each of the two housings includes an exhaust port configured to discharge a compressed gas compressed by the impeller,
the electric compressor further comprises an outlet manifold pipe for merging the compressed gas discharged from the exhaust port of each of the two housings, and
each of the two housings is configured so that an angle from a center of the intake port to a center of the exhaust port with a center of the shaft as a reference is smaller than 120°, in a cross section orthogonal to the axial direction of the shaft.

3. The electric compressor according to claim 1,
wherein the intake manifold pipe includes two connection portions, each of which being connected to the intake port, and
a flow path cross section of the connection portion has a longitudinal direction along a direction orthogonal to the axial direction of the shaft, and includes protruding curved portions formed on both end sides in the longitudinal direction.

4. The electric compressor according to claim 3,
wherein the flow path cross section of each of the two connection portions has a short direction along the axial direction of the shaft.

5. The electric compressor according to claim 3,
wherein the flow path cross section of each of the two connection portions is formed so that a length in the longitudinal direction increases toward an intake port side.

6. The electric compressor according to claim 5,
wherein the flow path cross section of each of the two connection portions is formed so that a maximum curvature of the protruding curved portion increases toward the intake port side.

7. The electric compressor according to claim 1,
wherein each of the two housings includes an anti-swirl plate that protrudes from a portion opposite to the intake port on the inner surface.

8. The electric compressor according to claim 7,
wherein a tip of the anti-swirl plate is located on an outer peripheral side of the shaft with respect to a tip end of a leading edge of the impeller.

9. The electric compressor according to claim 1,
wherein the intake manifold pipe includes two connection portions, each of which being connected to the intake port, and
each of the two housings is configured so that a virtual line obtained by extending a center axis of the connection portion corresponding to each of the housings in the intake manifold pipe does not intersect with a center of the shaft, when viewed in the axial direction of the shaft.

10. The electric compressor according to claim 9,
wherein each of the two housings includes
an inner surface that defines a supply flow path for guiding the gas supplied from the intake port to the impeller, the inner surface including an inner end wall surface that defines a side opposite to the impeller in the supply flow path, and an inner peripheral wall surface that defines an outer peripheral side of the supply flow path, and
an anti-swirl plate that protrudes from a portion opposite to the intake port on the inner surface, and
each of the two housings is configured so that a straight line defined by a center of the anti-swirl plate and the center of the shaft passes through an inside of the intake port, when viewed in the axial direction of the shaft.

11. The electric compressor according to claim 7,
wherein the intake manifold pipe includes two connection portions, each of which being connected to the intake port, and
each of the two housings is configured so that a virtual line obtained by extending a center axis of the connection portion corresponding to each of the housings in the intake manifold pipe extends parallel to a straight line defined by a center of the anti-swirl plate and a center of the shaft, at a position avoiding the center of the shaft, when viewed in the axial direction of the shaft.

* * * * *